United States Patent
Ding et al.

(10) Patent No.: US 12,112,482 B2
(45) Date of Patent: Oct. 8, 2024

(54) TECHNIQUES FOR INTERACTIVE IMAGE SEGMENTATION NETWORKS

(71) Applicant: Intel Corporation, Santa Clara, CA (US)

(72) Inventors: Ke Ding, San Jose, CA (US); Anthony Rhodes, Portland, OR (US); Manan Goel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 727 days.

(21) Appl. No.: 17/161,139

(22) Filed: Jan. 28, 2021

(65) Prior Publication Data

US 2021/0225002 A1     Jul. 22, 2021

(51) Int. Cl.
*G06T 7/11* (2017.01)
*G06N 3/045* (2023.01)

(52) U.S. Cl.
CPC ............... *G06T 7/11* (2017.01); *G06N 3/045* (2023.01); *G06T 2207/20081* (2013.01); *G06T 2207/20084* (2013.01)

(58) Field of Classification Search
CPC ............. G06T 7/11; G06T 2207/20081; G06T 2207/20084; G06T 2207/10024; G06N 3/045; G06N 3/082; G06N 5/01
See application file for complete search history.

(56) References Cited

U.S. PATENT DOCUMENTS

| | | | | |
|---|---|---|---|---|
| 11,042,742 B1 * | 6/2021 | Yang | | G06T 7/11 |
| 11,164,067 B2 * | 11/2021 | Liang | | G06V 10/764 |
| 11,538,166 B2 * | 12/2022 | Arani | | G06V 10/82 |
| 2021/0209822 A1 * | 7/2021 | Yang | | G06T 11/60 |
| 2021/0248761 A1 * | 8/2021 | Liu | | G06N 3/045 |
| 2021/0383538 A1 * | 12/2021 | Deasy | | A61B 6/5211 |
| 2022/0067950 A1 * | 3/2022 | Lv | | G06V 10/56 |
| 2022/0180476 A1 * | 6/2022 | Poddar | | G06V 10/48 |
| 2022/0262002 A1 * | 8/2022 | Wang | | G06T 7/10 |
| 2023/0290502 A1 * | 9/2023 | Zhi | | G16H 10/65 |
| 2023/0377155 A1 * | 11/2023 | Raharja | | G06T 7/0012 |

(Continued)

OTHER PUBLICATIONS

He et al. "Mask R-CNN," Computer Vision Foundation, ICCV, 2017, 9 pages.

(Continued)

*Primary Examiner* — Bobbak Safaipour
(74) *Attorney, Agent, or Firm* — Hanley, Flight & Zimmerman, LLC

(57) ABSTRACT

Various embodiments are generally directed to techniques for image segmentation utilizing context, such as with a machine learning (ML) model that injects context into various training stages. Many embodiments utilize one or more of an encoder-decoder model topology and select criteria and parameters in hyper-parameter optimization (HPO) to conduct the best model neural architecture search (NAS). Some embodiments are particularly directed to resizing context frames to a resolution that corresponds with a particular stage of decoding. In several embodiments, the context frames are concatenated with one or more of data from a previous decoding stage and data from a corresponding encoding stage prior to being provided as input to a next decoding stage.

20 Claims, 11 Drawing Sheets

(56) References Cited

U.S. PATENT DOCUMENTS

2024/0144711 A1* 5/2024 Zagaynov ............ G06V 30/164
2024/0169201 A1* 5/2024 Seok ........................ G06N 3/04

OTHER PUBLICATIONS

Li et al., "Interactive Image Segmentation with Latent Diversity," Computer Vision Foundation, CVPR, 2018, 9 pages.
Nirkin et al., "HyperSeg: Patch-wise Hypernetwork for Real-time Semantic Segmentation," Computer Vision Foundation, CVPR, 2021, 10 pages.
Jang et al., "Interactive Image Segmentation via Backpropagating Refinement Scheme," Computer Vision Foundation, CVPR, 2019, 10 pages.
Lin et al., "Interactive Image Segmentation with First Click Attention," Computer Vision Foundation, CVPR, 2020, 10 pages.
Simonyan et al., "Very Deep Convolutional Networks for Large-Scale Image Recognition," arXiv:1409.1556v6 [cs. CV], [https://doi.org/10.48550/arXiv.1409.1556], ICLR 2015, Apr. 10, 2015, 14 pages.
He et al., "Deep Residual Learning for Image Recognition," Computer Vision Foundation, CVPR, 2016, 9 pages.

* cited by examiner

| Name | Cat | Description | HP Type | Range |
|---|---|---|---|---|
| Batch size | HP | Global batch size | int | [32, 64, 128] |
| Learning rate | HP | Base learning rate | float | [0.00001, 0.001] |
| Optimizer | HP | Model optimizer | categorical | [adam, sgd] |
| Dropout | HP | Dropout ratio for all conv2d | float | [0.0, 0.8] |
| BN | HP | Batch normalization | bool | |
| Latent Diversity | NAS HP | 3 modes on how to use LD | categorical | [0, 1, 2] |
| Num conv2d layers | NAS HP | Number of conv2d layers in each decoding stage | categorical | [1, 2, 3] |
| Dilated conv | NAS HP | Size of dilation in decoding block | categorical | [0, 1, 2] |
| VGG conv ratio | NAS HP | Input output channel ratio for VGG skip connection channels | categorical | [1, 2, 4, 8] |
| De-conv ratio | NAS HP | Input output channel ratio for deconv | categorical | [1, 2, 4, 8] |
| Net scale | NAS HP | Number of network scale | categorical | [3, 4, 5] |

TECHNIQUES FOR INTERACTIVE IMAGE SEGMENTATION NETWORKS

TECHNICAL FIELD

Embodiments described herein generally relate to techniques for image segmentation networks, such as interactive image segmentation networks.

BACKGROUND

Machine learning is the study of computer algorithms that improve automatically through experience. Typically, machine learning algorithms build a model based on sample data, referred to as training data, in order to make predictions or decisions without explicitly being programmed to do so. For example, in digital image processing and computer vision, machine learning can be used for image segmentation without explicitly being programmed to do so. Image segmentation can include the process of partitioning a digital image into multiple segments (e.g., sets of pixels, also known as image objects). Typically, the goal of image segmentation is to simplify and/or change a representation of an image into something that is more meaningful or easier to analyze. For instance, in an image of a landscape, trees may be converted to red, roads to blue, cars to green, and people to yellow to simplify distinguishing between trees, roads, cars, and people.

BRIEF SUMMARY

This summary is not intended to identify only key or essential features of the described subject matter, nor is it intended to be used in isolation to determine the scope of the described subject matter. The subject matter should be understood by reference to appropriate portions of the entire specification of this patent, any or all drawings, and each claim.

BRIEF DESCRIPTION OF THE SEVERAL VIEWS OF THE DRAWINGS

FIG. 6A illustrates exemplary optimization parameters according to one or more embodiments described hereby.

DETAILED DESCRIPTION

Figure 1:
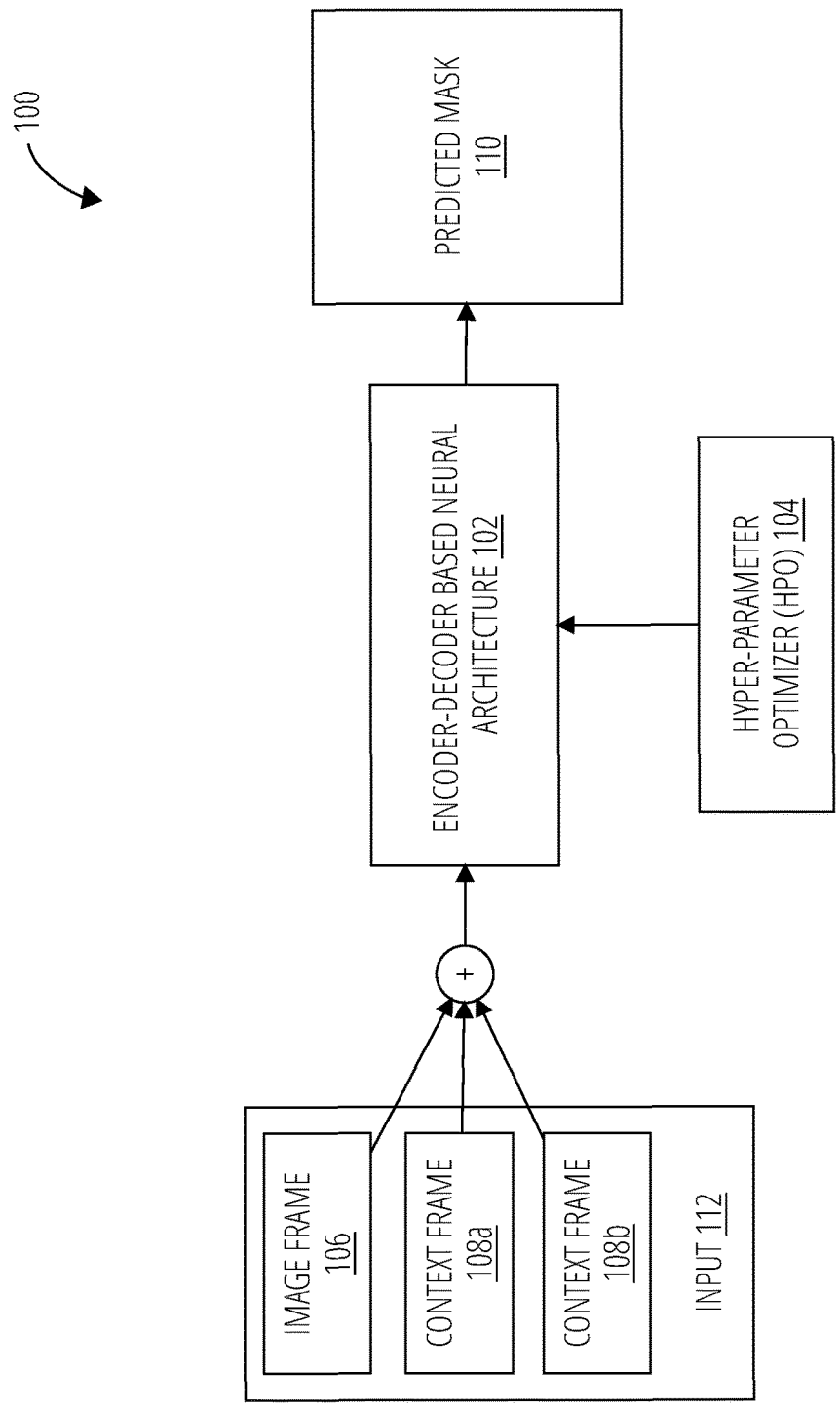
FIG. 1 illustrates an exemplary operating environment for an encoder-decoder based neural architecture according to one or more embodiments described hereby.

Various embodiments are generally directed to techniques for image segmentation utilizing context, such as with a machine learning (ML) model that injects context into various training stages. Many embodiments utilize one or more of an encoder-decoder model topology and select criteria and parameters in hyper-parameter optimization (HPO) to conduct the best model neural architecture search (NAS). Some embodiments are particularly directed to resizing context frames to a resolution that corresponds with a particular stage of decoding. In several embodiments, the context frames are concatenated with one or more of data from a previous decoding stage and data from a corresponding encoding stage prior to being provided as input to a next decoding stage. These and other embodiments are described and claimed.

Due to the complexity and broad applicability of image segmentation, considerable resources have been invested into it since the inception of computer vision. However, many challenges still face image segmentation. For example, hand-crafted features and distance metrics can be required for a majority of segmentation tasks, especially when deep learning techniques are used. When building wider and/or deeper networks to tackle complex segmentation problems, manual crafting and tuning becomes suboptimal, such as due to the amount of choices needed for both model topologies and hyper parameters. Further, deep learning based approaches suffer from huge computational resource requirements during training and inference, especially when dealing with high resolution images in professional content creation, healthcare (e.g., medical images), and autonomous driving use cases. These deep learning-based image segmentation approaches may include ICCV 2017 Mask-RCNN (which does object detection and instance segmentation in one), CVPR 2018 interactive image segmentation with latent diversity from Intel® and HyperSeg 2020 version, CVPR 2019 interactive image segmentation with backpropagation refinement and the CVPR 2020 version, and CVPR 2020 interactive image segmentation with first click attention network (which emphasized the importance of the first click using attention mechanism). Adding further complexity, when few parameters are exposed and/or ineffective parameters are utilized for training and optimizing models, the inability to and the resource demands for producing accurate models, as well as for inferencing with the models, is greatly exacerbated. Such limitations can drastically reduce the usability and applicability of ML techniques, contributing to lost economies of scale, missed insights, and inefficient systems, devices, and techniques with limited capabilities.

Various embodiments described hereby provide an image segmentation framework and algorithm that dramatically reduces the amount of computation for both training and inference while still achieving state-of-the-art model accuracy. Many embodiments inject context frames into various training stages to improve accuracy and/or efficiency. In many such embodiments, the context frames are resized to a resolution that corresponds with a current stage of decoding. In several embodiments, the context frames are concatenated with one or more of data from a previous decoding stage and data from a corresponding encoding stage prior to being provided as input to a next decoding stage. In various embodiments, a flexible and optimized encoder-decoder model topology (e.g., based on SegNet) and/or using HPO to conduct the best model NAS with select criteria and parameters may, at least in part, reduce the amount of computation for both training and inference while still achieving state-of-the-art model accuracy. For instance, the model may be designed in a flexible way so that many architecture knobs are exposed and able to be searched through HPO/NAS, which can be extremely useful for specific and varying use cases, such as a different design target for model size, through put, accuracy, latency, resolution, etcetera. In many embodiments, one or more of the following architecture variables may be used, including the number of encoder blocks, the number of decoder blocks, the number of convolutional layers within a decoding block (or stage), the ratio of input and output channels, the ratio of input and output channels in visual geometry group (VGG) skip connections, and the size of dilation in decoding blocks.

In these and other ways, components/techniques described here may identify methods to increase efficiency, decrease performance costs, decrease computational cost, and/or reduce resource requirements for image segmentation in an accurate, customizable, efficient, dynamic, and scalable manner, resulting in several technical effects and advantages over conventional computer technology, including increased capabilities and improved adaptability. In various embodiments, one or more of the aspects, techniques, and/or components described hereby may be implemented in a practical application via one or more computing devices, and thereby provide additional and useful functionality to the one or more computing devices, resulting in more capable, better functioning, and improved computing devices. For example, a practical application may include efficiently training an ML model to segment an image into one or more objects and/or features, such as to automate rotoscoping, medical image analysis, or object detection (e.g., in autonomous driving). Further, one or more of the aspects, techniques, and/or components described hereby may be utilized to improve the technical fields of ML, image segmentation, rotoscoping, image analysis, autonomous driving, and/or context integration.

In several embodiments, components described hereby may provide specific and particular manners to enable development, evaluation, management, and optimization of ML models. In many embodiments, one or more of the components described hereby may be implemented as a set of rules that improve computer-related technology by allowing a function not previously performable by a computer that enables an improved technological result to be achieved. For example, the function allowed may include one or more of the specific and particular techniques disclosed hereby such as generating output data including a decoding frame with the first resolution based on a decoding frame with the second resolution and a context frame of the second resolution. In another example, the function may include resizing a context frame of an original resolution to produce the context frame of the second resolution. In yet another example, the function may include concatenating the decoding frame with the second resolution and the context frame of the second resolution prior to generation of the output data with the decoder. In still another example, the function may include optimizing criteria and/or hyperparameters comprising one or more of a number of encoders and decoders, a number of convolutional layers within decoders, a ratio between input and output channels, and a size of dilation in the decoder. One or more techniques described hereby may provide time-to-training improvements over other techniques. For example, a 3x speedup may be achieved even with better training and validation loss, as well as accuracy.

With general reference to notations and nomenclature used hereby, one or more portions of the detailed description which follows may be presented in terms of program procedures executed on a computer or network of computers. These procedural descriptions and representations are used by those skilled in the art to effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described hereby that form part of one or more embodiments. Rather, these operations are machine operations. Useful machines for performing operations of various embodiments include general purpose digital computers as selectively activated or configured by a computer program stored within that is written in accordance with the teachings hereby, and/or include apparatus specially constructed for the required purpose. Various embodiments also relate to apparatus or systems for performing these operations. These apparatuses may be specially constructed for the required purpose or may include a general-purpose computer. The required structure for a variety of these machines will be apparent from the description given.

Reference is now made to the drawings, whereby like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well known structures and devices are shown in block diagram form to facilitate a description thereof. The intention is to cover all modification, equivalents, and alternatives within the scope of the claims.

FIG. 1 illustrates an exemplary operating environment 100 according to one or more embodiments described hereby. Operating environment 100 may include encoder-decoder based neural architecture 102, hyper-parameter optimizer (HPO) 104, input 114, and predicted mask 112. In the illustrated embodiment, input 114, image frame 108, context frame 110a, and context frame 110b. In one or more embodiments, encoder-decoder based neural architecture 102 and HPO 104 may interoperate to produce an ML model capable of producing predicted mask 112 based on input 114 comprising image frame 108, context frame 110a, and context frame 110b. In many such embodiments, the predicted mask 112 may be utilized for image segmentation. Embodiments are not limited in this context.

More generally, FIG. 1 includes a high-level model flow diagram for producing predicted mask 112 with encoder-decoder based neural architecture 102 and HPO 104 based on input 114. The encoder-decoder based neural architecture 102 may comprise a deep convolutional encoder-decoder architecture. In some embodiments, the encoder-decoder based neural architecture 102 may utilize a number of convolution/deconvolution layers. In various embodiments, the input 114 for the model includes image frame 108 comprising a three-channel red green blue (RGB) image, context frame 110a comprising a diffusion map from user clicks on the foreground of the RGB image, and context frame 110b comprising a diffusion map from user clicks on the background of the RGB image. In several embodiments, all the input channels are concatenated together and feed into the encoder-decoder based neural architecture 102 (e.g., SegNet). The output is the predicted mask 112 (e.g., a binary mask). The HPO 104 conducts the best model neural architecture search. In some embodiments the predicted mask 112 may be used as part of automating image segmentation, such as for rotoscoping or transferring an image into another video sequence.

Figure 2:
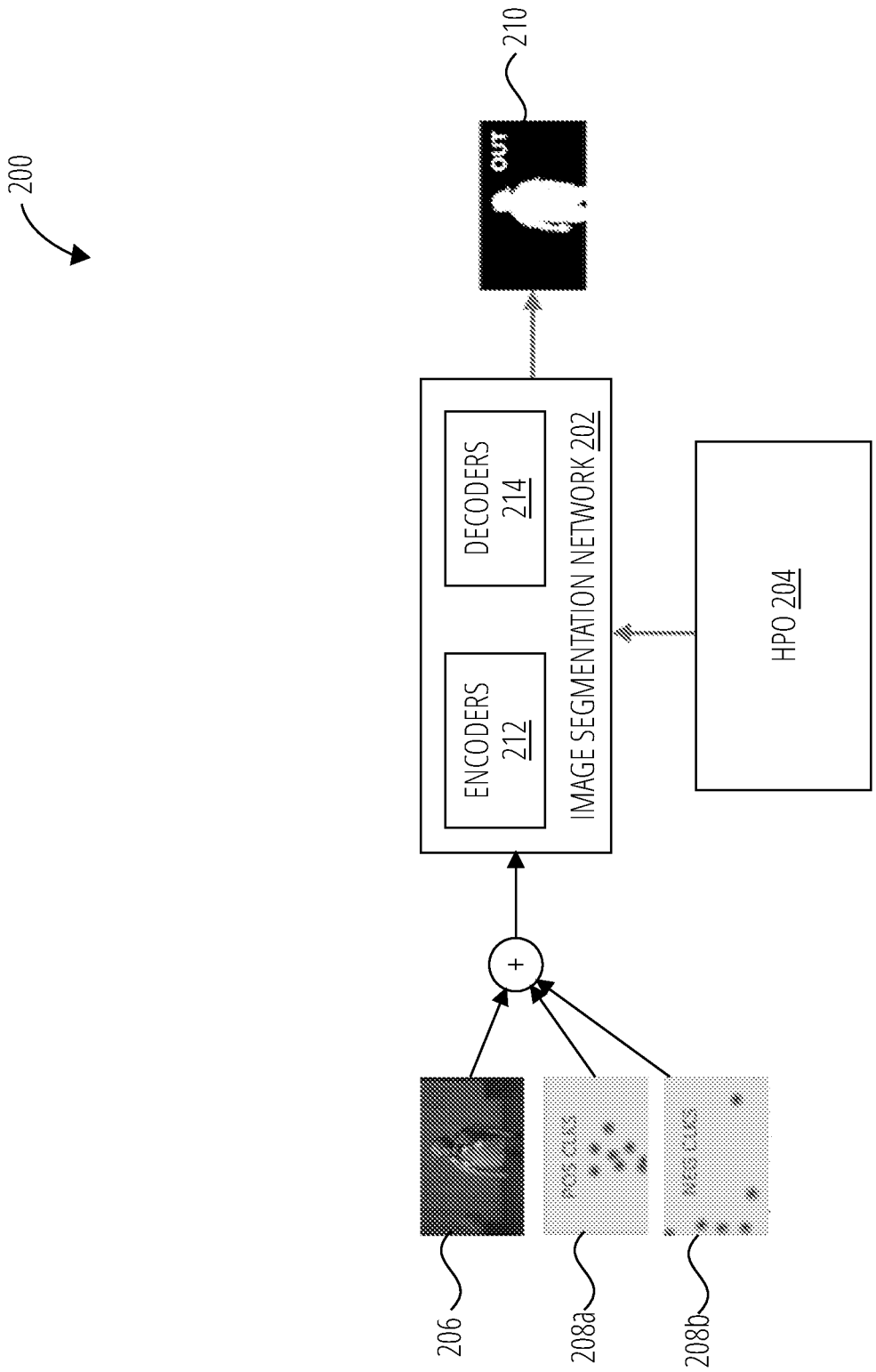
FIG. 2 illustrates an exemplary operating environment for an image segmentation network according to one or more embodiments described hereby.

FIG. 2 illustrates an exemplary operating environment 200 according to one or more embodiments described hereby. Operating environment 200 may include image segmentation network 202, HPO 204, image frame 208, context frame 210a, context frame 210b, and predicted mask 212. In the illustrated embodiment, the image segmentation network 202 includes a set of one or more encoders 214 and a set of one or more decoders 216. As will be described in more detail below, such as with respect to FIG. 3, each of the one or more encoders 214 may correspond to an encoding stage or encoding block and each of the one or more decoders 216 may correspond to a decoding stage or decoding block. In many embodiments, the image segmentation network 202 may comprise a convolutional encoder-decoder architecture with a plurality of convolution/deconvolution layers. In many such embodiments, each convolution layer may correspond to one of the encoders 214 and each deconvolution layer may correspond to one of the decoders 216. Additionally, one or more of the decoders 216 may correspond with one or more of the encoders 214. For example, there may be corresponding encoder/decoder pairs. Embodiments are not limited in this context.

Image frame 208 may include a three-channel red green blue (RGB) image. For instance, image frame 208 may be a video frame. Context frame 210a may include a diffusion map from user clicks on the foreground of the image frame 208 and context frame 210b may include a diffusion may from user clicks on the background of the image frame 208. For example, context frame 210a may result from user input in the form of clicking the foreground in the image frame 208 and context frame 210b may result from user input in the form of clicking the background in the image frame 208. In various embodiments, one or more of the inputs (e.g., image frame 208, context frame 210a, and context frame 110b) may be concatenated together.

Figure 3:
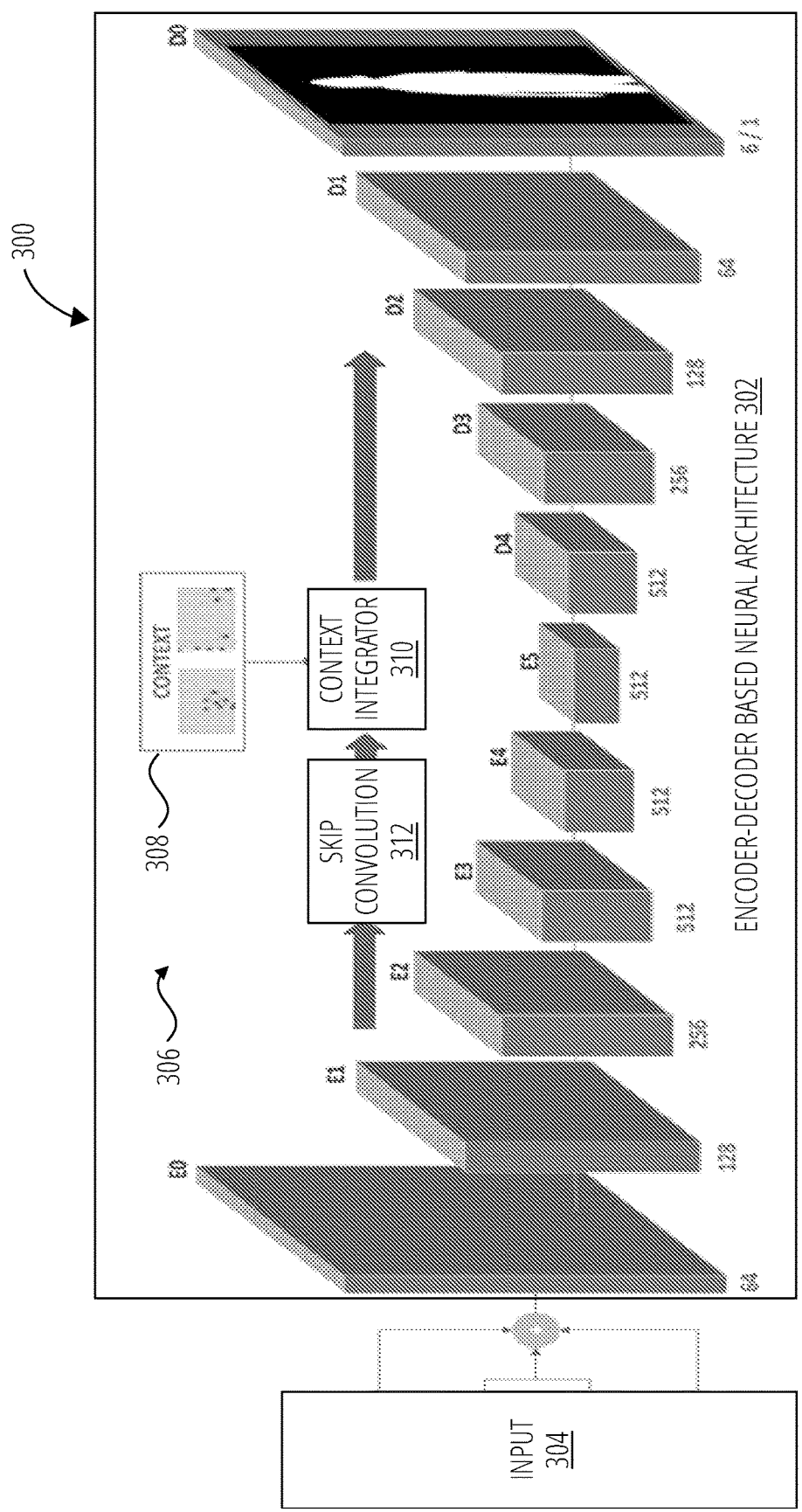
FIG. 3 illustrates aspects of an exemplary encoder-decoder based neural architecture according to one or more embodiments described hereby.

FIG. 3 illustrates an exemplary operating environment 300 according to one or more embodiments described hereby. Operating environment 300 may include input 304 and encoder-decoder based neural architecture 302. In the illustrated embodiment, encoder-decoder based neural architecture 302 includes a plurality of encoder layers (E0, E1, E2, E3, E4, E5), a plurality of decoder layers (D4, D3, D2, D1, D0), and context-aware skip connection 306. The context-aware skip connection 306 may include one or more context frames 308, skip convolution 312, and context integrator 310. In one or more embodiments disclosed hereby, a context-aware skip connection 306 may be included between one or more corresponding encoder/decoder layers. For example, a context-aware skip connection 306 may exist between one or more of E0 and D0, E1 and D1, E2, and D2, E3 and D3, and E4 and D4. In some embodiments, the encoder layers may utilize pretrained weights (e.g., VGG19 weights) and the decoder layers may utilize learned weights. Generally, resolution may decrease (from down sampling) from E0 to E5 while resolution may increase (from up sampling) from D4 to D0. Further, in the illustrated embodiment, E0 and D1 may include 64 channels, E1 and D2 may include 128 channels, E2 and D3 may include 256 channels, and E3, E4, E5, and D4 may include 512 channels. Embodiments are not limited in this context.

Operating environment 300 illustrates a detailed model architecture of encoder-decoder based neural architecture 302. In many embodiments, the detailed model architecture may include a SegNet model architecture. In several embodiments, the encoder-decoder based neural architecture 302 may utilizes a pre-trained VGG19 backbone as the primary encoder portion. In several such embodiments, the encoder-decoder based neural architecture 302 trains the model primarily on the decoder portion. In other embodiments, different backbones may be utilized, such as ResNet series RN50, RN 101, etcetera.

In several embodiments, each of the encoder layers may generate, as output, an encoding frame with less resolution based on an encoding frame with a higher resolution. On the other hand, each of the decoder layers may generate, as output, a decoding frame with a higher resolution based on a decoding frame with a lower resolution. In various embodiments, one or more encoding frames and/or decoding frames may comprise a feature map.

In many embodiments, between each level of encoder and decoder block there is a context-aware skip connection 306. The context-aware skip connection 306 may have one or more of the following input sources: (1) output channels from encoding block, $E_i$, which may then go through a convolution processes (e.g., skip convolution 312); (2) deconvolution from the previous decoding block, $D_{i+1}$; and (3) one or more context frames 308, which may be resized by context integrator 310 based on the resolution of decoding block, $D_i$. For instance, the diffusion maps in context frame 210a and context frame 210b may be resized for each decoding block that includes the context-aware skip connection 306. It will be appreciated that 'i' in $E_i$, $D_i$, $D_{i+1}$, etcetera refers to a reference block, layer, or frame for example purposes. For example, referring to FIG. 3, if 'i' is two, $E_i$ refers to E2, $D_i$ refers to D2, and $D_{i+1}$ refers to D3. In many embodiments, each of the input sources are concatenated together, such as via context integrator 310.

Figure 4:
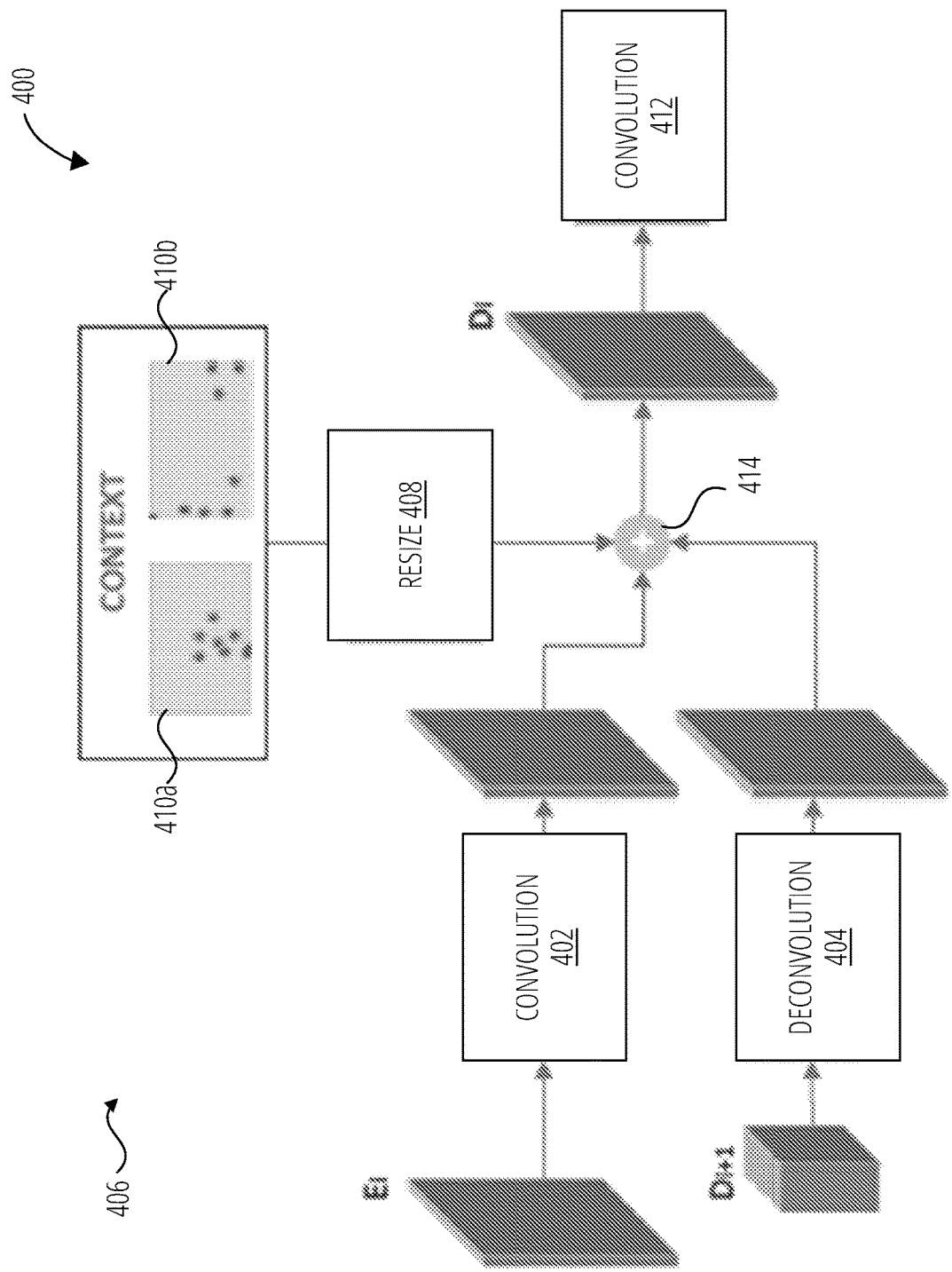
FIG. 4 illustrates an exemplary context-aware skip connection according to one or more embodiments described hereby.

FIG. 4 illustrates an exemplary operating environment 400 according to one or more embodiments described hereby. Operating environment 400 may include encoding block, $E_i$, decoding block, $D_{i+1}$, deconvolution 404, context-aware skip connection 406, decoding block, $D_i$, and convolution 412. Context-aware skip connection 406 includes convolution 402, resize 408, context frame 410a, and context frame 410b. In many embodiments, the process flow illustrated in FIG. 4 may be repeated for one or more of the encoder/decoder pairs. In some such examples, corresponding encoder/decoder pairs may have common or corresponding resolutions. For example, the input of an encoder may be the same resolution as the output of the corresponding decoder and the output of the encoder may be the same resolution as the input of the corresponding decoder. Embodiments are not limited in this context.

In many embodiments, between each level of encoder and decoder block there is a context-aware skip connection 406. In the illustrated embodiment, the context-aware skip connection 406 includes the following input sources: (1) output channels from encoding block, $E_i$, which may then go through a convolution processes at convolution 402; (2) output of deconvolution 404, from the previous decoding block, $D_{i+1}$; and (3) context frames 410a, 410b which are be resized at resize 408 based on the resolution of decoding block, $D_i$. The inputs are then concatenated at concatenate 414 prior to being provided to decoding block, $D_i$. The output of decoding block, $D_i$, may be provided to convolution 412.

Figure 5:
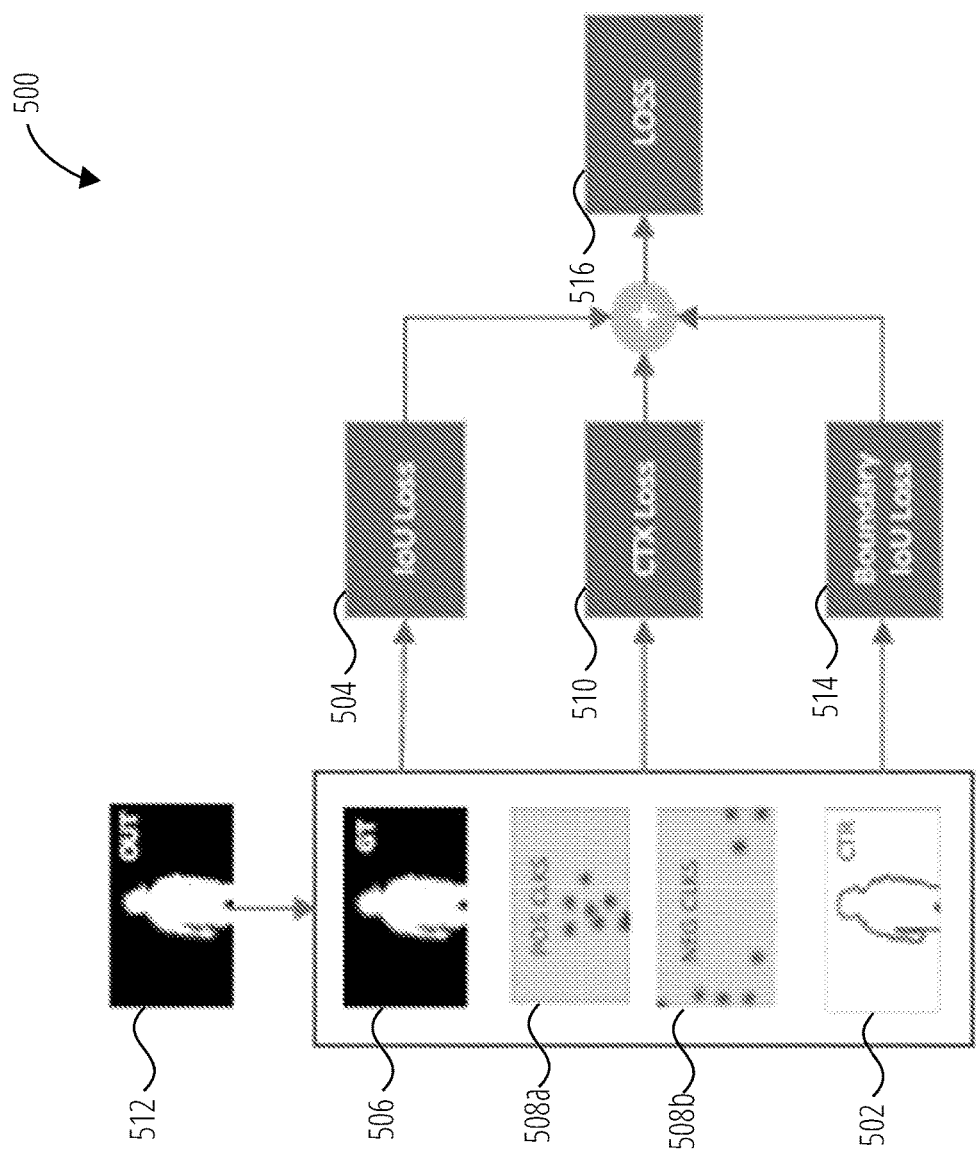
FIG. 5 illustrates aspects of computing aggregate loss according to one or more embodiments described hereby.

FIG. 5 illustrates an exemplary operating environment 500 according to one or more embodiments described hereby. Operating environment 500 may include predicted mask 512, ground truth 506, context frame 508a, context frame 508b, boundary frame 502, IoU loss 504, context loss 510, boundary IoU loss 514, and aggregate loss 516. Operating environment 500 illustrates a process flow for computing aggregate loss 516. Aggregate loss 516 may be a combination of intersection over union (IoU) loss 504, context loss 510, and boundary IoU loss 514. The IoU loss 504 may be determined based on a comparison of predicted mask 512 to ground truth 506. In some embodiments, ground truth 506 may comprise an exemplary segmented mask. For example, ground truth 506 may be an exemplary segmented mask for separating background and foreground in an image. The context loss 510 may be determined based on a comparison of predicted mask 512 to context frames 508a, 508b. The boundary IoU loss may be determined based on a comparison of predicted mask 512 to boundary frame 502. In many embodiments, aggregate loss 516 may be the sum of IoU loss 504, context loss 510, and boundary IoU loss 514. Embodiments are not limited in this context.

FIG. 6A illustrates an exemplary table of optimization parameters 602 according to one or more embodiments described hereby. In various embodiments, optimization parameters 602 may be searched by HPO 104 and/or HPO 204. Accordingly, the encoder-decoder based neural architecture 102 and/or image segmentation network 202 may be designed in a flexible manner such that many architecture knobs are exposed and able to be searched through HPO/NAS. This exposure of adjustable parameters can enable the architecture to be adapted for a variety of design targets, such as one or more of model size, throughput, accuracy, latency, resolution, etcetera. Embodiments are not limited in this context.

Many embodiments disclosed hereby utilized one or more of the following architecture variables: (1) network scale: number of encoder and decoder blocks (impacts model performance and accuracy); (2) number of conv2d layers: total number of convolutional layers within a decoding block; (3) deconvolution ratio: ratio between input and output channels; (4) VGG convolution ratio: ratio between input and output channels in VGG skip connection; and (5) dilated convolution: size of dilation in decoding block.

FIG. 6A includes a set of optimization parameters 602 that may be utilized by one or more embodiments described hereby. Optimization parameters 602 includes the following parameters categorized as hyper parameters (HP): batch size, learning rate, optimizer, dropout, and BN. Batch size may refer to the global batch size. In various embodiments, the batch size parameter may include a discrete integer value. In various such embodiments, the batch size may be one of 32, 64, and 128. Learning rate may refer to the base learning rate. In many embodiments, the learning rate may be a floating point value. In many such embodiments, the learning rate may be between 0.00001 and 0.001. Optimizer may refer to the model optimizer. In some embodiments, the optimizer may be selected from a set or a categorical selection (e.g., adam, sgd). Dropout may refer to the dropout ratio for all conv2d. In several embodiments, the dropout may be a floating point value. In several such embodiments, the dropout may be between 0.0 and 0.8. BN may refer to batch normalization. In various embodiments, BN may be a Boolean value. For example, batch normalization may either be enabled (e.g., true) or disabled (e.g., false).

Optimization parameters 602 includes the following parameters categorized as neural architecture search hyper parameters (NAS HP): latent diversity, num conv2d layers, dilated conv, VGG conv ratio, de-conv ratio, and net scale. Each of the NAS HP parameter values are selected from a set or a categorical selection. Latent diversity may refer to different modes of using latent diversity. In some embodiments, latent diversity may be either mode one (e.g., 1), mode two (e.g., 2), or mode three (e.g., 3). Num conv2d layers may refer to the number of conv2d layers in each decoding stage. In various embodiments, num conv2d layers may be either 1, 2, or 3. Dilated conv may refer to the size of dilation in decoding blocks. In many embodiments, dilated conv may be either, 0, 1, or 2. VGG conv ratio may refer to the input output channel ratio for VGG skip connection channels. In one or more embodiments, the VGG conv ratio may be either 1, 2, 4, or 8. The de-conv ratio may refer to the input output channel ratio for deconvolutions. In several embodiments, the de-conv ratio may be either 1, 2, 4, or 8. The net scale may refer to the number of network scale. In some embodiments, the net scale may be either 3, 4, or, 5.

Figure 6B:
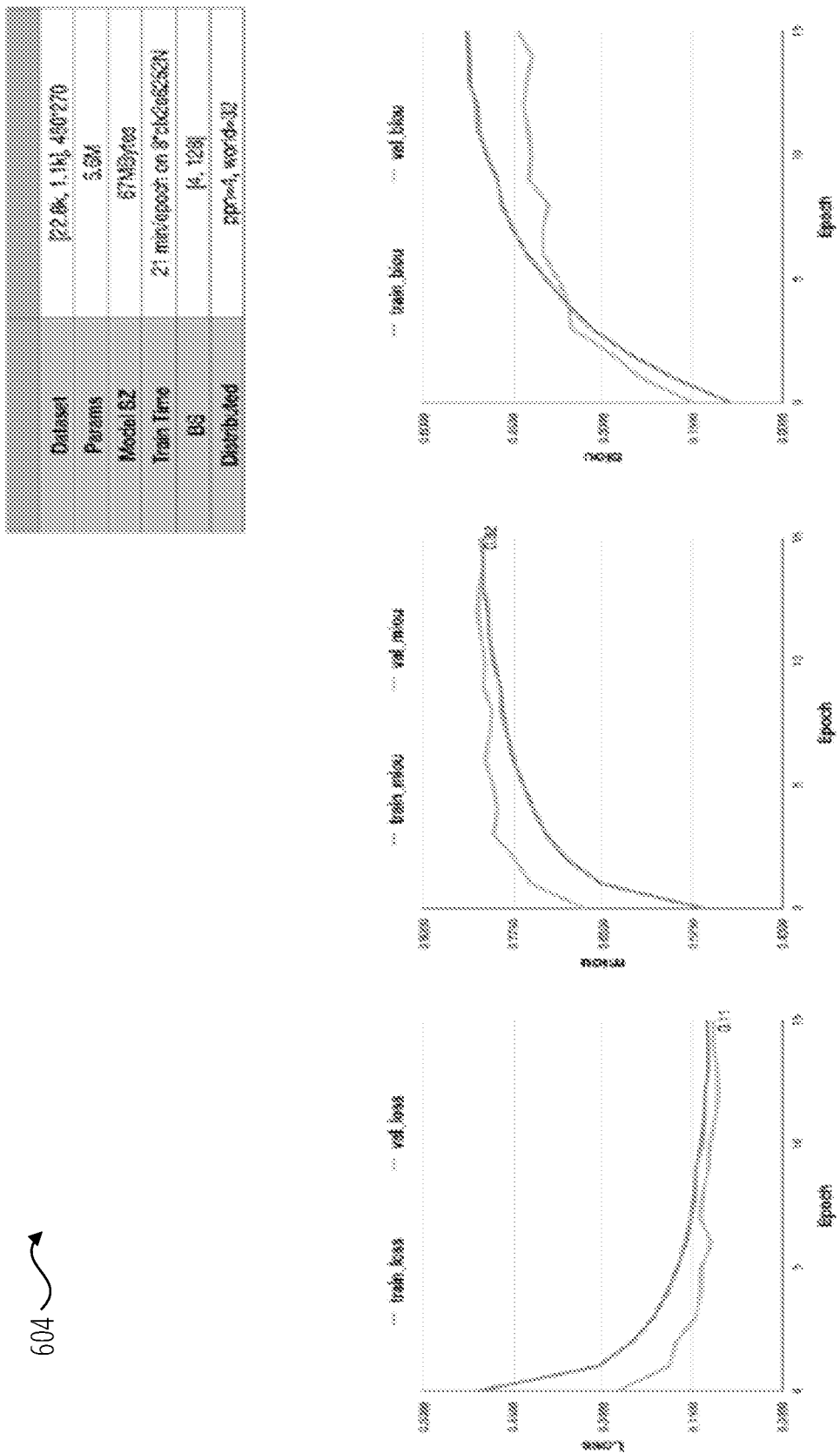
FIG. 6B illustrates exemplary training results according to one or more embodiments described hereby.

FIG. 6B illustrates exemplary training results 604 on a 270p dataset according to one or more embodiments described hereby. Embodiments are not limited in this context.

Figure 6C:
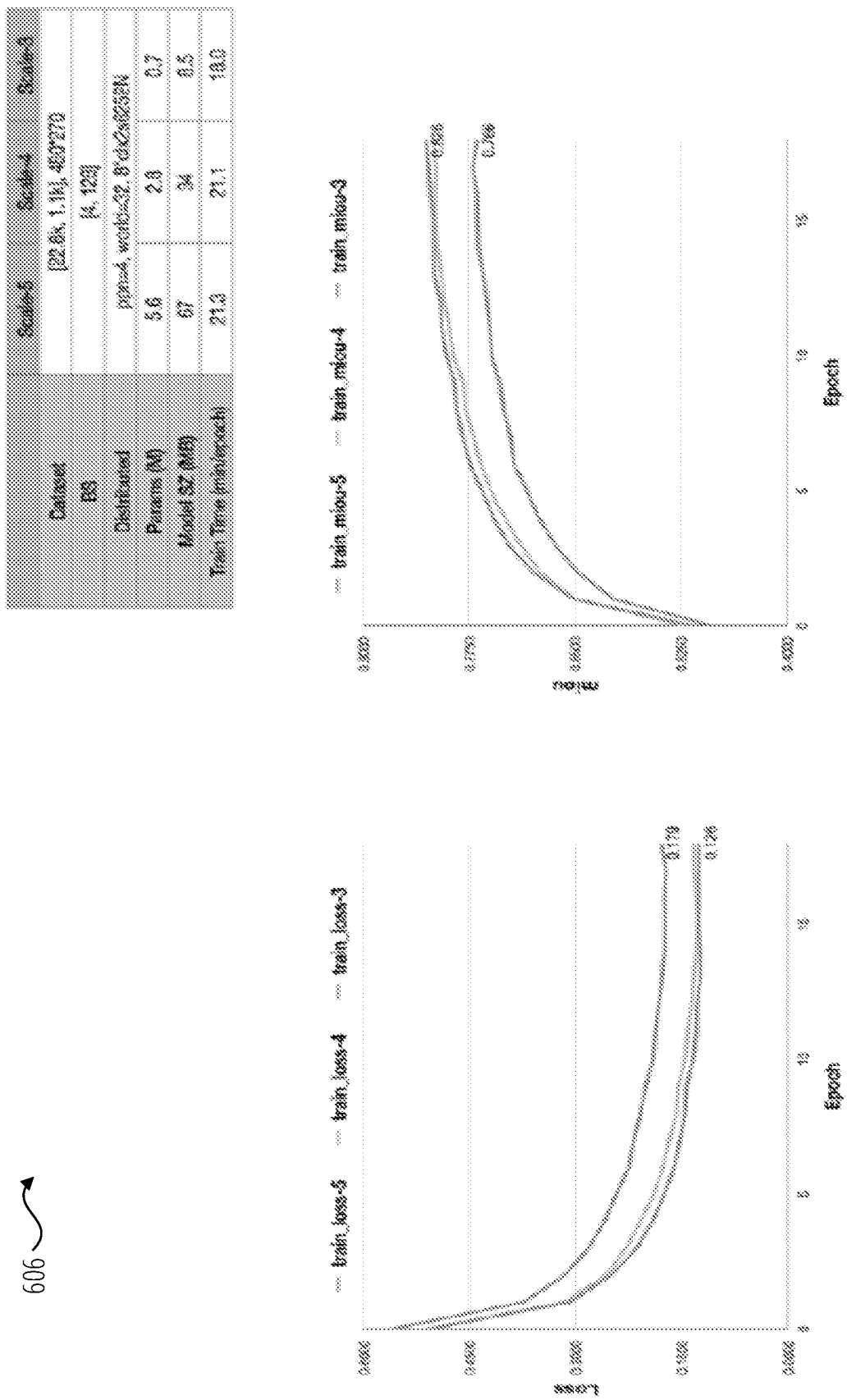
FIG. 6C illustrates exemplary model performance according to one or more embodiments described hereby.

FIG. 6C illustrates exemplary model performance 606 with different net-scale parameter values. according to one or more embodiments described hereby. Embodiments are not limited in this context.

Figure 7:
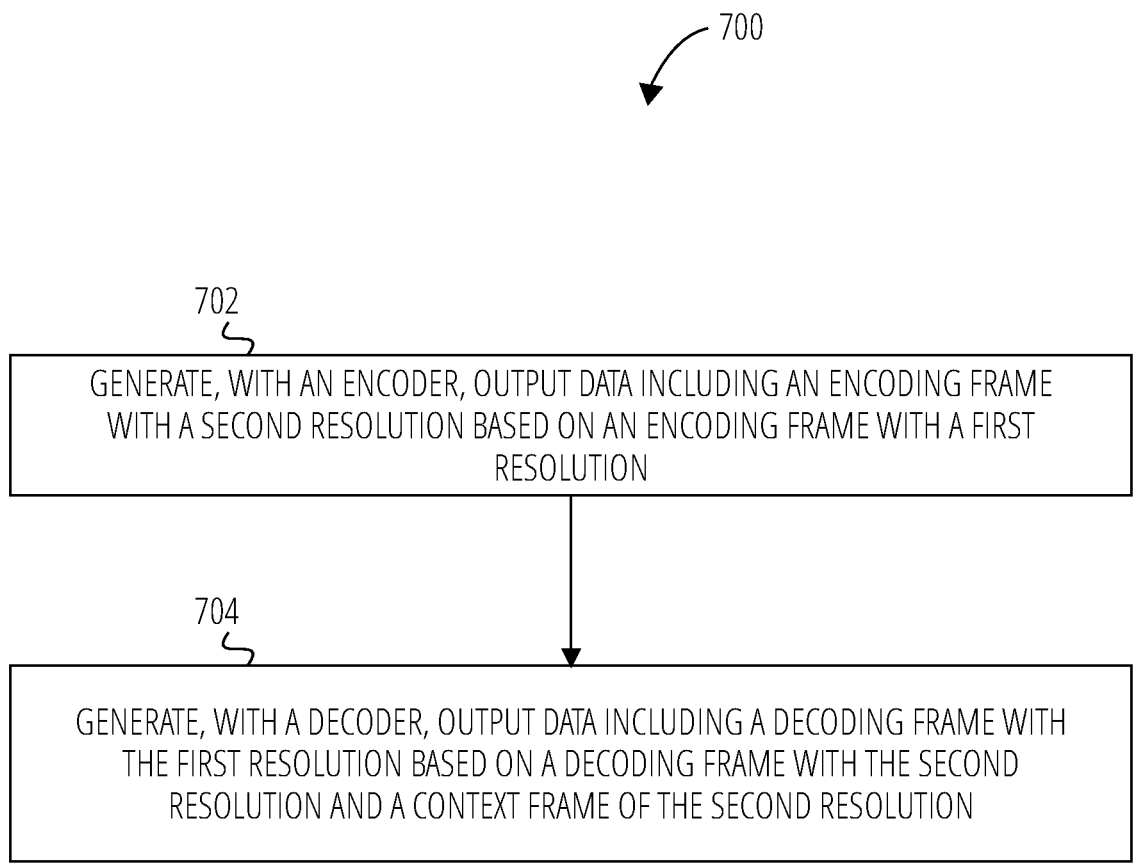
FIG. 7 illustrates an exemplary logic flow according to one or more embodiments described hereby.

FIG. 7 illustrates one embodiment of a logic flow 700, which may be representative of operations that may be executed in various embodiments in conjunction with techniques disclosed hereby. The logic flow 700 may be representative of some or all of the operations that may be executed by one or more components/devices/environments described herein, such as encoder-decoder based neural architecture 102, context-aware skip connection 306, or context integrator 310. The embodiments are not limited in this context.

In the illustrated embodiment, logic flow 700 may begin at block 702. At block 702 "generate, with an encoder, output data including an encoding frame with a second resolution based on an encoding frame with a first resolution" output data comprising an encoding frame with a second resolution may be generated based on an encoding frame with a first resolution. For example, encoder E2 may generate output data comprising an encoding frame with a second resolution based on an encoding frame with a first resolution higher than the second resolution.

At block 704 "generate, with a decoder, output data including a decoding frame with the first resolution based on a decoding frame with the second resolution and a context frame of the second resolution output data including a decoding frame with the first resolution may be generated based on a decoding frame with the second resolution and a context frame of the second resolution. For instance, decoder, D2 may generate output data comprising a decoding frame with the first resolution based on a decoding frame with the second resolution and a context frame 308 with the second resolution.

Figure 8:
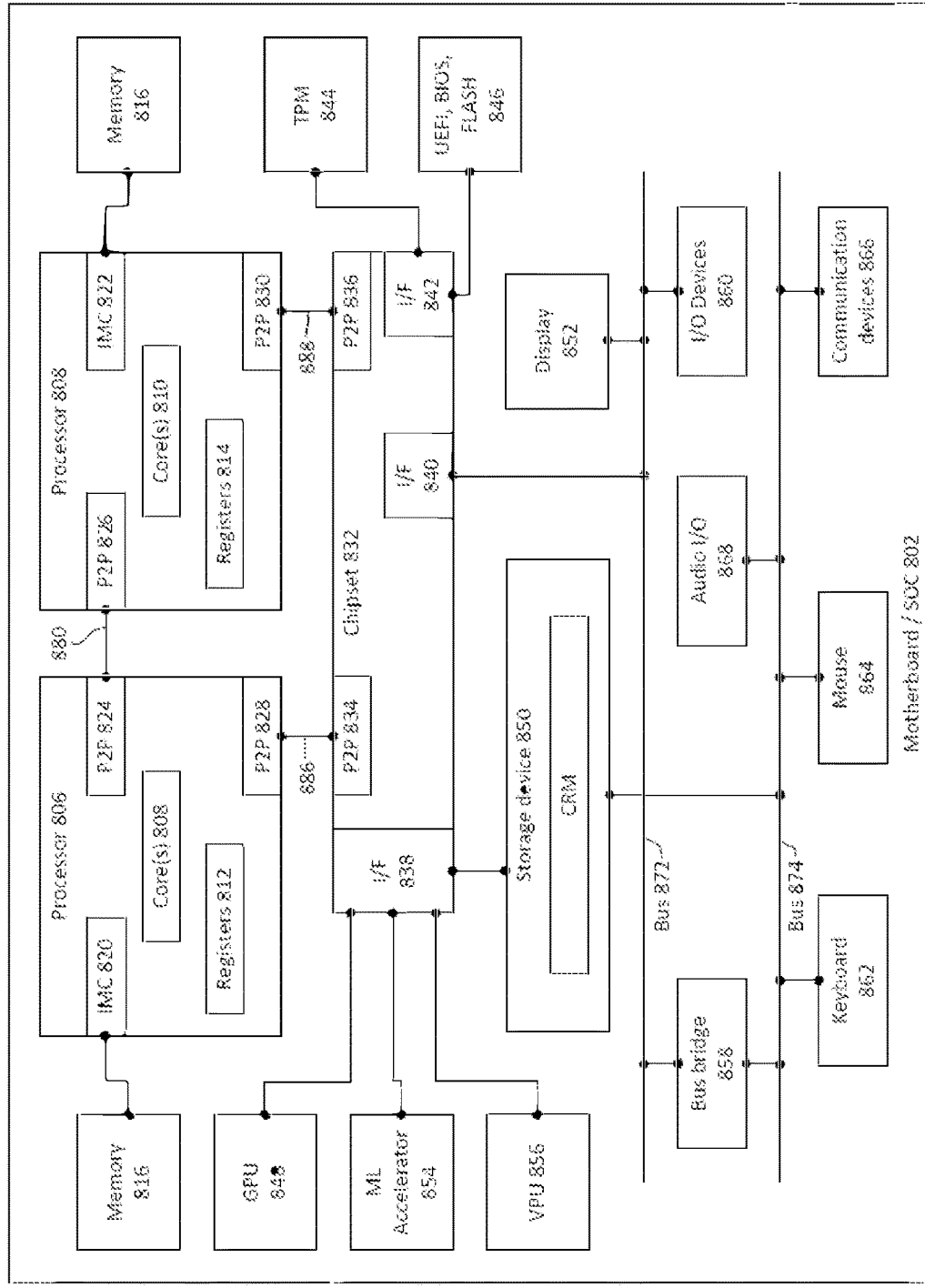
FIG. 8 illustrates exemplary aspects of a computing system according to one or more embodiments described hereby.

FIG. 8 illustrates an embodiment of a system 800 that may be suitable for implementing various embodiments described hereby. System 800 is a computing system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores. In at least one embodiment, the computing system 800 is representative of one or more components described hereby, such as encoder-decoder based neural architecture 102, HPO 104, or context-aware skip connection 306. More generally, the computing system 800 is configured to implement all logic, systems, logic flows, methods, apparatuses, and functionality described hereby with reference to FIGS. 1-9. The embodiments are not limited in this context.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical, solid-state, and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard or system-on-chip (SoC) 802 for mounting platform components. Motherboard or system-on-chip (SoC) 802 is a point-to-point (P2P) interconnect platform that includes a first processor 804 and a second processor 806 coupled via a point-to-point interconnect 870 such as an Ultra Path Interconnect (UPI). In other embodiments, the system 800 may be of another bus architecture, such as a multi-drop bus. Furthermore, each of processor 804 and processor 806 may be processor packages with multiple processor cores including core(s) 808 and core(s) 810, respectively. While the system 800 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 804 and chipset 832. Some platforms may include additional components and some platforms may only include sockets to mount the processors and/or the chipset. Furthermore, some platforms may not have sockets (e.g. SoC, or the like).

The processor 804 and processor 806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 804 and/or processor 806. Additionally, the processor 804 need not be identical to processor 806.

Processor 804 includes an integrated memory controller (IMC) 820 and point-to-point (P2P) interface 824 and P2P interface 828. Similarly, the processor 806 includes an IMC 822 as well as P2P interface 826 and P2P interface 830. IMC 820 and IMC 822 couple the processors processor 804 and processor 806, respectively, to respective memories (e.g., memory 816 and memory 818). Memory 816 and memory 818 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 816 and memory 818 locally attach to the respective processors (i.e., processor 804 and processor 806). In other embodiments, the main memory may couple with the processors via a bus and shared memory hub.

System 800 includes chipset 832 coupled to processor 804 and processor 806. Furthermore, chipset 832 can be coupled to storage device 850, for example, via an interface (I/F) 838. The I/F 838 may be, for example, a Peripheral Component Interconnect-enhanced (PCI-c). Storage device 850 can store instructions executable by circuitry of system 800 (e.g., processor 804, processor 806, GPU 848, ML accelerator 854, vision processing unit 856, or the like). For example, storage device 850 can store instructions for ML model developer 106 (deleted), GUI 108 (deleted), ML model evaluator 112 (deleted), ML model developer 302 (deleted), or ML model evaluator 402 (deleted), logic flow 702 (deleted), or the like.

Processor 804 couples to a chipset 832 via P2P interface 828 and P2P 834 while processor 806 couples to a chipset 832 via P2P interface 830 and P2P 836. Direct media interface (DMI) 876 and DMI 878 may couple the P2P interface 828 and the P2P 834 and the P2P interface 830 and P2P 836, respectively. DMI 876 and DMI 878 may be a high-speed interconnect that facilitates, e.g., eight Giga Transfers per second (GT/s) such as DMI 3.0. In other embodiments, the processor 804 and processor 806 may interconnect via a bus.

The chipset 832 may comprise a controller hub such as a platform controller hub (PCH). The chipset 832 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 832 may comprise more than one controller hub such as a chipset with a memory controller hub, a graphics controller hub, and an input/output (I/O) controller hub.

In the depicted example, chipset 832 couples with a trusted platform module (TPM) 844 and UEFI, BIOS, FLASH circuitry 846 via I/F 842. The TPM 844 is a dedicated microcontroller designed to secure hardware by integrating cryptographic keys into devices. The UEFI, BIOS, FLASH circuitry 846 may provide pre-boot code.

Furthermore, chipset 832 includes the I/F 838 to couple chipset 832 with a high-performance graphics engine, such as, graphics processing circuitry or a graphics processing unit (GPU) 848. In other embodiments, the system 800 may include a flexible display interface (FDI) (not shown) between the processor 804 and/or the processor 806 and the chipset 832. The FDI interconnects a graphics processor core in one or more of processor 804 and/or processor 806 with the chipset 832.

Additionally, ML accelerator 854 and/or vision processing unit 856 can be coupled to chipset 832 via I/F 838. ML accelerator 854 can be circuitry arranged to execute ML related operations (e.g., training, inference, etc.) for ML models. Likewise, vision processing unit 856 can be circuitry arranged to execute vision processing specific or related operations. In particular, ML accelerator 854 and/or vision processing unit 856 can be arranged to execute mathematical operations and/or operands useful for machine learning, neural network processing, artificial intelligence, vision processing, etc.

Various I/O devices 860 and display 852 couple to the bus 872, along with a bus bridge 858 which couples the bus 872 to a second bus 874 and an I/F 840 that connects the bus 872 with the chipset 832. In one embodiment, the second bus 874 may be a low pin count (LPC) bus. Various devices may couple to the second bus 874 including, for example, a keyboard 862, a mouse 864 and communication devices 866.

Furthermore, an audio I/O 868 may couple to second bus 874. Many of the I/O devices 860 and communication devices 866 may reside on the motherboard or system-on-chip (SoC) 802 while the keyboard 862 and the mouse 864 may be add-on peripherals. In other embodiments, some or all the I/O devices 860 and communication devices 866 are add-on peripherals and do not reside on the motherboard or system-on-chip (SoC) 802.

Figure 9:
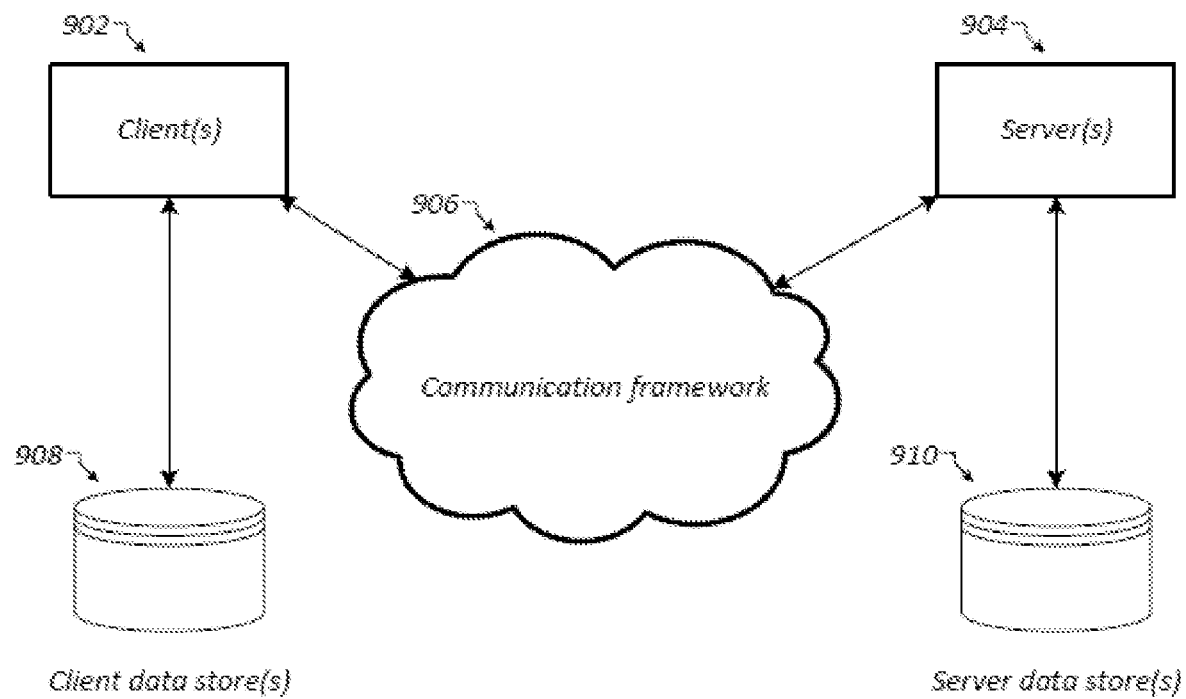
FIG. 9 illustrates exemplary aspects of a communications architecture according to one or more embodiments described hereby.

FIG. 9 illustrates a block diagram of an exemplary communications architecture 900 suitable for implementing various embodiments as previously described, such as communications between encoder-decoder based neural architecture 102 and HPO 104. The communications architecture 900 includes various common communications elements, such as a transmitter, receiver, transceiver, radio, network interface, baseband processor, antenna, amplifiers, filters, power supplies, and so forth. The embodiments, however, are not limited to implementation by the communications architecture 900.

As shown in FIG. 9, the communications architecture 900 comprises includes one or more clients 902 and servers 904. In some embodiments, communications architecture may include or implement one or more portions of components, applications, and/or techniques described hereby. The clients 902 and the servers 904 are operatively connected to one or more respective client data stores 908 and server data stores 910 that can be employed to store information local to the respective clients 902 and servers 904, such as cookies and/or associated contextual information. In various embodiments, any one of servers 904 may implement one or more of logic flows or operations described hereby, such as in conjunction with storage of data received from any one of clients 902 on any of server data stores 910. In one or more embodiments, one or more of client data store(s) 908 or server data store(s) 910 may include memory accessible to one or more portions of components, applications, and/or techniques described hereby.

The client(s) 902 and the server(s) 904 may communicate information between each other using a communication framework 906. The communications framework 906 may implement any well-known communications techniques and protocols. The communications framework 906 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 906 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1900 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 902 and the servers 904. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described hereby. Such representations, known as "IP cores" may be stored on a tangible, machine readable medium and supplied to various customers or manufacturing facilities to load into the fabrication machines that actually make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The following examples pertain to further embodiments, from which numerous permutations and configurations will be apparent.

Example 1 is an apparatus, the apparatus comprising: a processor; and a memory comprising instructions that when executed by the processor cause the processor to: generate, with an encoder, output data including an encoding frame with a second resolution based on an encoding frame with a first resolution; and generate, with a decoder, output data including a decoding frame with the first resolution based on a decoding frame with the second resolution and a context frame of the second resolution.

Example 2 includes the subject matter of Example 1, the memory comprising instructions that when executed by the processor cause the processor to resize a context frame of an original resolution to produce the context frame of the second resolution.

Example 3 includes the subject matter of Example 1, the memory comprising instructions that when executed by the processor cause the processor to concatenate the decoding frame with the second resolution and the context frame of the second resolution prior to generation of the output data with the decoder.

Example 4 includes the subject matter of Example 1, the memory comprising instructions that when executed by the processor cause the processor to generate, with the decoder, the output data including the decoding frame with the first resolution based on the decoding frame with the second resolution, the context frame of the second resolution, and one or more portions of the output data generated by the encoder.

Example 5 includes the subject matter of Example 4, the memory comprising instructions that when executed by the processor cause the processor to: concatenate the decoding frame with the second resolution, the context frame of the second resolution, and the one or more portions of the output data generated by the encoder to produce decoder input data; and provide the decoder input data to the decoder for generation of the output data including the decoding frame with the first resolution.

Example 6 includes the subject matter of Example 1, the memory comprising instructions that when executed by the processor cause the processor to optimize hyperparameters associated with the encoder or the decoder, the hyperparameters comprising one or more of a number of encoders and decoders, a number of convolutional layers within the decoder, a ratio between input and output channels, and a size of dilation in the decoder.

Example 7 includes the subject matter of Example 1, wherein the encoding frame with the first resolution, the encoding frame with the second resolution, the decoding frame with the first resolution, or the decoding frame with the second resolution comprise at least one feature map.

Example 8 includes the subject matter of Example 1, the memory comprising instructions that when executed by the processor cause the processor to perform a convolution operation on the encoding frame with the first resolution to generate the output data including the encoding frame with the second resolution.

Example 9 includes the subject matter of Example 1, the memory comprising instructions that when executed by the processor cause the processor to perform a deconvolution operation on the decoding frame with the second resolution to generate the output data including the decoding frame with the first resolution.

Example 10 is at least one non-transitory computer-readable medium comprising a set of instructions that, in response to being executed by a processor circuit, cause the processor circuit to: generate, with an encoder, output data including an encoding frame with a second resolution based on an encoding frame with a first resolution; and generate, with a decoder, output data including a decoding frame with the first resolution based on a decoding frame with the second resolution and a context frame of the second resolution.

Example 11 includes the subject matter of Example 10, comprising instructions that, in response to being executed by the processor circuit cause the processor circuit to resize a context frame of an original resolution to produce the context frame of the second resolution.

Example 12 includes the subject matter of Example 10, comprising instructions that, in response to being executed by the processor circuit cause the processor circuit to concatenate the decoding frame with the second resolution and the context frame of the second resolution prior to generation of the output data with the decoder.

Example 13 includes the subject matter of Example 10, comprising instructions that, in response to being executed by the processor circuit cause the processor circuit to generate, with the decoder, the output data including the decoding frame with the first resolution based on the decoding frame with the second resolution, the context frame of the second resolution, and one or more portions of the output data generated by the encoder.

Example 14 includes the subject matter of Example 13, comprising instructions that, in response to being executed by the processor circuit cause the processor circuit to: concatenate the decoding frame with the second resolution, the context frame of the second resolution, and the one or more portions of the output data generated by the encoder to produce decoder input data; and provide the decoder input data to the decoder for generation of the output data including the decoding frame with the first resolution.

Example 15 includes the subject matter of Example 10, comprising instructions that, in response to being executed by the processor circuit cause the processor circuit to optimize hyperparameters associated with the encoder or the decoder, the hyperparameters comprising one or more of a number of encoders and decoders, a number of convolutional layers within the decoder, a ratio between input and output channels, and a size of dilation in the decoder.

Example 16 is a computer-implemented method, comprising: generating, with an encoder, output data including an encoding frame with a second resolution based on an encoding frame with a first resolution; and generating, with a decoder, output data including a decoding frame with the first resolution based on a decoding frame with the second resolution and a context frame of the second resolution Example 17 includes the subject matter of Example 16, comprising resizing a context frame of an original resolution to produce the context frame of the second resolution.

Example 18 includes the subject matter of Example 16, comprising: concatenating the decoding frame with the second resolution and the context frame of the second resolution to produce decoder input data; and providing the decoder input data to the decoder for generation of the output data including the decoding frame with the first resolution.

Example 19 includes the subject matter of Example 16, comprising generating, with the decoder, the output data including the decoding frame with the first resolution based on the decoding frame with the second resolution, the context frame of the second resolution, and one or more portions of the output data generated by the encoder.

Example 20 includes the subject matter of Example 16, comprising optimizing hyperparameters associated with the encoder or the decoder, the hyperparameters comprising one or more of a number of encoders and decoders, a number of convolutional layers within the decoder, a ratio between input and output channels, and a size of dilation in the decoder.

Examine 21 is an apparatus, comprising: means for generating, with an encoder, output data including an encoding frame with a second resolution based on an encoding frame with a first resolution; and means for generating, with a decoder, output data including a decoding frame with the first resolution based on a decoding frame with the second resolution and a context frame of the second resolution.

Example 22 includes the subject matter of Example 21, comprising means for resizing a context frame of an original resolution to produce the context frame of the second resolution.

Example 23 includes the subject matter of Example 21, comprising: means for concatenating the decoding frame with the second resolution and the context frame of the second resolution to produce decoder input data; and means for providing the decoder input data to the decoder for generation of the output data including the decoding frame with the first resolution.

Example 24 includes the subject matter of Example 21, comprising generating, with the decoder, the output data including the decoding frame with the first resolution based on the decoding frame with the second resolution, the context frame of the second resolution, and one or more portions of the output data generated by the encoder.

Example 25 includes the subject matter of Example 21, comprising means for optimizing hyperparameters associated with the encoder or the decoder, the hyperparameters comprising one or more of a number of encoders and decoders, a number of convolutional layers within the decoder, a ratio between input and output channels, and a size of dilation in the decoder.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated hereby.

What is claimed is:

1. An apparatus comprising:
   interface circuitry;
   instructions; and
   one or more first processor circuits to utilize the instructions to:
      conduct a neural architecture search to select respective values for hyperparameters of a machine learning (ML) model, the ML model associated with a neural architecture having one or more encoders, one or more decoders, and one or more skip connections between the one or more encoders and the one or more decoders, the hyperparameters indicative of a first number of the one or more encoders and the one or more decoders to be included in the neural architecture, a second number of convolutional layers within respective ones of the one or more decoders, and a size of dilation in the respective ones of the one or more decoders; and
      cause the interface circuitry to deploy the ML model with the respective values for the hyperparameters, the ML model to cause one or more second processor circuits to:
         based on a first encoding frame with a first resolution, generate, with a first encoder, first output data including a second encoding frame with a second resolution; and
         generate, with a first decoder, second output data including a first decoding frame with the first resolution based on a second decoding frame with the second resolution and a context frame with the second resolution.

2. The apparatus of claim 1, wherein the context frame is a first context frame, and the ML model is to cause at least one of the one or more second processor circuits to resize a second context frame with an original resolution to produce the first context frame with the second resolution.

3. The apparatus of claim 1, wherein the ML model is to cause at least one of the one or more second processor circuits to concatenate the second decoding frame with the second resolution and the context frame with the second resolution prior to generation of the second output data with the first decoder.

4. The apparatus of claim 1, wherein the ML model is to cause at least one of the one or more second processor circuits to generate, with the first decoder, the second output data including the first decoding frame with the first resolution based on the second decoding frame with the second resolution, the context frame with the second resolution, and one or more portions of the first output data generated by the first encoder.

5. The apparatus of claim 4, wherein the ML model is to cause at least one of the one or more second processor circuits to:
concatenate the second decoding frame with the second resolution, the context frame with the second resolution, and the one or more portions of the first output data generated by the first encoder to produce decoder input data; and
provide the decoder input data to the first decoder for generation of the second output data including the first decoding frame with the first resolution.

6. The apparatus of claim 1, wherein at least one of the first encoding frame with the first resolution, the second encoding frame with the second resolution, the first decoding frame with the first resolution, or the second decoding frame with the second resolution includes at least one feature map.

7. The apparatus of claim 1, wherein the ML model is to cause at least one of the one or more second processor circuits to perform a convolution operation on the first encoding frame with the first resolution to generate the first output data including the second encoding frame with the second resolution.

8. The apparatus of claim 1, wherein the ML model is to cause at least one of the one or more second processor circuits to perform a de-convolution operation on the second decoding frame with the second resolution to generate the second output data including the first decoding frame with the first resolution.

9. At least one non-transitory computer-readable medium comprising instructions that cause one or more first processor circuits to:
conduct a neural architecture search to select respective values for hyperparameters of a machine learning (ML) model, the ML model associated with a neural architecture having one or more encoders, one or more decoders, and one or more skip connections between the one or more encoders and the one or more decoders, the hyperparameters indicative of a first number of the one or more encoders and the one or more decoders to be included in the neural architecture, a second number of convolutional layers within respective ones of the one or more decoders, and a size of dilation in the respective ones of the one or more decoders; and cause interface circuitry to deploy the ML model with the respective values for the hyperparameters, the ML model to cause one or more second processor circuits to:
based on a first encoding frame with a first resolution, generate, with a first encoder, first output data including a second encoding frame with a second resolution; and
generate, with a first decoder, second output data including a first decoding frame with the first resolution based on a second decoding frame with the second resolution and a context frame with the second resolution.

10. The at least one non-transitory computer-readable medium of claim 9, wherein the context frame is a first context frame, and the ML model is to cause at least one of the one or more second processor circuits to resize a second context frame with an original resolution to produce the first context frame with the second resolution.

11. The at least one non-transitory computer-readable medium of claim 9, wherein the ML model is to cause at least one of the one or more second processor circuits to concatenate the second decoding frame with the second resolution and the context frame with the second resolution prior to generation of the second output data with the first decoder.

12. The non-transitory computer-readable medium of claim 9, wherein the ML model is to cause at least one of the one or more second processor circuits to generate, with the first decoder, the second output data including the first decoding frame with the first resolution based on the second decoding frame with the second resolution, the context frame with the second resolution, and one or more portions of the first output data generated by the first encoder.

13. The non-transitory computer-readable medium of claim 12, wherein the ML model is to cause at least one of the one or more second processor circuits to:
concatenate the second decoding frame with the second resolution, the context frame with the second resolution, and the one or more portions of the first output data generated by the first encoder to produce decoder input data; and
provide the decoder input data to the first decoder for generation of the second output data including the first decoding frame with the first resolution.

14. An apparatus, comprising:
means for optimizing respective values for hyperparameters of a machine learning (ML) model, the ML model associated with a neural architecture having one or more encoders, one or more decoders, and one or more skip connections between the one or more encoders and the one or more decoders, the hyperparameters indicative of a first number of the one or more encoders and the one or more decoders to be included in the neural architecture, a second number of convolutional layers within respective ones of the one or more decoders, and a size of dilation in the respective ones of the one or more decoders; and
means for deploying the ML model with the respective values for the hyperparameters, the ML model to cause:
means for generating, with a first encoder, first output data based on a first encoding frame with a first resolution, the first output data including a second encoding frame with a second resolution; and
means for generating, with a first decoder, second output data including a first decoding frame with the first resolution based on a second decoding frame with the second resolution and a context frame with the second resolution.

15. The apparatus of claim 14, wherein the context frame is a first context frame, and the ML model is to cause means for resizing a second context frame with an original resolution to produce the first context frame with the second resolution.

16. The apparatus of claim 14, wherein the ML model is to cause:
means for concatenating the second decoding frame with the second resolution and the context frame with the second resolution to produce decoder input data; and
means for providing the decoder input data to the first decoder for generation of the second output data including the first decoding frame with the first resolution.

17. The apparatus of claim 14, wherein the ML model is to cause means for generating, with the first decoder, the second output data including the first decoding frame with the first resolution based on the second decoding frame with the second resolution, the context frame with the second resolution, and one or more portions of the first output data generated by the first encoder.

18. The apparatus of claim 1, wherein the hyperparameters are indicative of a first ratio between respective first input channels to be processed by and respective first output channels produced by the respective ones of the one or more decoders, a second ratio between respective second input channels to be processed by and respective second output channels produced by respective ones of the one or more skip connections, a batch size for the ML model, a learning rate for the ML model, an optimizer to be utilized to perform the neural architecture search, a dropout ratio for respective ones of the convolution layers, whether batch normalization is enabled for the ML model, and which form of latent diversity the ML model is to utilize.

19. The at least one non-transitory computer-readable medium of claim 9, wherein the hyperparameters are indicative of a first ratio between respective first input channels to be processed by and respective first output channels produced by the respective ones of the one or more decoders, a second ratio between respective second input channels to be processed by and respective second output channels produced by respective ones of the one or more skip connections, a batch size for the ML model, a learning rate for the ML model, an optimizer to be utilized to perform the neural architecture search, a dropout ratio for respective ones of the convolution layers, whether batch normalization is enabled for the ML model, and which form of latent diversity the ML model is to utilize.

20. The apparatus of claim 14, wherein the hyperparameters are indicative of a first ratio between respective first input channels to be processed by and respective first output channels produced by the respective ones of the one or more decoders, a second ratio between respective second input channels to be processed by and respective second output channels produced by respective ones of the one or more skip connections, a batch size for the ML model, a learning rate for the ML model, an optimizer to be utilized to perform the optimizing, a dropout ratio for respective ones of the convolution layers, whether batch normalization is enabled for the ML model, and which form of latent diversity the ML model is to utilize.

* * * * *